Patented July 10, 1951

2,559,629

UNITED STATES PATENT OFFICE 2,559,629

POLYFLUOROALKANOIC COMPOUNDS AND THEIR PREPARATION

Kenneth L. Berry, Hockessin, Del., assignor to E. I. du Pont de Nemours & Company, Wilmington, Del., a corporation of Delaware No Drawing. Application December 13, 1948, Serial No. 65,065

13 Claims. (Cl. 260—408)

This invention relates to a new class of fluorinated organic compounds. More particularly, this invention relates to certain new fluorocarboxylic acids, to their salts and to methods for their preparation.

In spite of the great technical interest of fluorinated organic compounds and of the considerable advances made in their chemistry in the last few years, long chain fluorocarboxylic acids of high fluorine content have heretofore remained unknown. The synthesis of aliphatic fluorocarboxylic acids is notoriously difficult and there are no known general or even specific methods of preparing those acids having seven or more carbon atoms.

It is an object of this invention to provide new polyfluoroalkanoic acids and their salts. A further object is to provide new methods of preparing polyfluoroalkanoic acids and their salts. A still further object is to provide new polyfluoroalkanoic acids which have extreme stability and inertness. Another object is to provide new polyfluoroalkanoic acid salts which have marked surface-active properties. Still another object is to provide new polyfluoroalkanoic acids and their salts which have many novel and useful properties. Other objects will appear hereinafter.

These and other objects and advantages are accomplished by providing a new class of chemical compounds, the polyfluoroalkanoic compounds consisting of the straight chain polyfluoroalkanoic acids and their inorganic salts of the formula $H(CX_2CX_2)_nCOOM$, wherein X is a halogen of atomic weight below 40, that is fluorine or chlorine, and at least half of the X's are fluorine, $n$ is an integer from 3 to 10 inclusive and M is hydrogen, or an ammonium or metal cation. These new polyfluoroalkanoic acids have the formula $H(CX_2CX_2)_nCOOH$, wherein the X substituents are halogen atoms of atomic weight below 40 and at least half of the halogen atoms in each $CX_2CX_2$ group are fluorine and $n$ is a positive integer from 3 to 10 inclusive. The preferred new polyfluoroalkanoic compounds have the formula $H(CF_2CF_2)_nCOOM$, wherein $n$ is a positive integer from 3 to 10 inclusive and M is defined as aforesaid. The preferred straight chain polyfluoroalkanoic acids have the formula $H(CF_2CF_2)_nCOOH$, wherein $n$ is a positive integer from 3 to 10 inclusive.

This invention also provides a method of preparing these new polyfluoroalkanoic acids and their salts which comprises permanganate oxidation of a polyfluoroalkanol which is the reaction product of methanol and a fully halogenated polyfluoroethylene, said polyfluoroalkanol having the formula $H(CX_2CX_2)_nCH_2OH$, wherein X is a halogen of atomic weight below 40 and at least half of the X's in each $CX_2CX_2$ group are fluorine and $n$ is an integer from 3 to 10 inclusive. The preferred polyfluoroalkanols are the reaction products of methanol and tetrafluoroethylene and have the formula $H(CF_2CF_2)_nCH_2OH$, wherein $n$ is a positive integer from 3 to 10 inclusive.

In the preferred mode of operating the process of this invention, the polyfluoroalkanol to be oxidized is dissolved in a suitable organic acid, such as the alkanoic acids, for example, acetic acid. The solution is brought to a temperature between 50 and 100° C. and treated portion-wise with finely ground potassium permanganate, preferably used in excess. The resulting polyfluoroalkanoic acid may be isolated by various means. To obtain it in a pure state on a small or moderate scale, it is desirably isolated as the crude manganous salt, from which the free acid is obtained by acidification followed by distillation and/or crystallization.

The starting materials, i. e., the polyfluoroalkanols of the general formula

$$H(CX_2CX_2)_nCH_2OH$$

wherein the X's represent halogen atoms of atomic weight below 40, at least half of which in each $CX_2CX_2$ group are fluorine, and $n$ is an integer from 3 to 10 inclusive, may be prepared by the method described in copending application Serial No. 65,063, filed by R. M. Joyce on December 13, 1948, as a continuation-in-part of application Serial No. 567,777, filed December 11, 1944, and now abandoned. This method consists in heating at a suitable temperature, such as between 75° and 350° C., in the presence of a free radical-producing catalyst, a mixture of methanol with a completely halogenated fluoroethylene containing at least two fluorine atoms, the remaining halogen atoms, if any, being chlorine atoms. Preferably, the fluoroethylene compound is tetrafluoroethylene. The catalyst may be, for example, an organic or inorganic peroxide such as diethyl peroxide, di-tert. butyl peroxide, benzoyl peroxide, lauroyl peroxide, hydrogen peroxide, and the like; or it may be one of the very active catalysts described in application Serial No. 2,551, filed by Madison Hunt on January 15, 1948, now Patent No. 2,471,959, i. e., an organic azo compound wherein the azo, —N=N—, group is acylic and bonded from both its nitrogen atoms to aliphatic carbon atoms, at least one of which is tertiary, particularly the azobis(alphacyanoalkanes) such as alpha,alpha'-azodiisobutyronitrile; alpha,alpha'-azobis(alpha, gamma-dimethylvaleronitrile); 1,1'-azodicyclohexanecarbonitrile, and the like; or it may be a salt of a peracid, such as ammonium persulfate, sodium perborate, potassium percarbonate and the like.

The products of this reaction, as carried out for example between tetrafluoroethylene and methanol, are mixtures of polyfluoroalkanols of the formula $H(CF_2CF_2)_nCH_2OH$. These mixtures may be separated, e. g. by steam distillation, fractional distillation and/or fractional crystallization from appropriate solvents, into rather well defined constituents wherein $n$ has various values between the limits stated. While tetrafluoroethylene is the preferred reagent, other completely halogenated ethylenes containing chlorine may be used, these compounds including chlorotrifluoroethylene, 1,1-dichloro-2,2-difluoroethylene and 1,2-dichloro-1,2-difluoroethylene.

For the purpose of illustrating the present invention more fully, a typical preparation of the intermediate polyfluoroalkanols is described below.

A mixture of 150 parts of methanol and 2 parts of tert.-butyl octyle peroxide was placed in a high pressure reactor. The reactor was closed, evacuated, cooled and charged with 110 parts of tetrafluoroethylene through a valve. The reactor was agitated and heated at 170° C. for 10 hours under autogenous pressure (90 atm.). The reaction product was subjected to steam distillation. The steam-volatile material was a mixture of liquid and solid product which was separated into the two phases. The liquid fraction was subjected to fractional distillation, giving a series of compounds $H(CF_2CF_2)_nCH_2OH$. The solid steam-volatile fraction was recrystallized from chloroform to give 17.5 parts of the compound in which $n$ equals 6 and a second fraction, 5 parts, in which $n$ equals 5. The filtrate from the recrystallization was evaporated and distilled to give 18 parts of a mixture of the compounds in which $n$ equals 4 and 5. Longer chain polyfluoroalkanols may be isolated by fractional crystallization or sublimation. For example, fractional sublimation of the non steam-volatile fraction gives polyfluoroalkanols in which $n$ is 6, 7 and 8. The properties of some of these materials are shown in the table below.

$[H(CF_2CF_2)_nCH_2OH.]$

| $n$ | B. P., ° C. | M. P., ° C. |
|---|---|---|
| 2 | 149 | |
| 3 | 169–170 | |
| 4 | | 62–67 |
| 5 | | 95–97 |
| 6 | | 125–126 |
| 7 | | 155–160 |
| 8 | | 185–190 |

The oxidizing agent used for the conversion of the polyfluoroalkanols to the corresponding acids is an alkali or alkaline earth metal permanganate, which is preferably potassium permanganate but can also be, for example, sodium, lithium, calcium or barium permanganate. It has been found that the permanganates are specific oxidizing agents in the process of this invention. However, the combination of nitric acid with nitrogen peroxide ($N_2O_4$) will also effect the oxidation under sufficiently drastic conditions. Other conventional oxidizing agents, such as perchloric acid, chromic oxide, sodium hypochlorite or hydrogen peroxide are ineffective. The oxidation is preferably carried out in acidic media, although alkaline oxidation can also be used. The best results are obtained when the polyfluoroalkanol is dissolved in a saturated carboxylic acid such as acetic, propionic, or butyric acid, which solution may contain other solvents or diluents such as water. Water alone, as such or containing an acid such as sulfuric acid may be used as the reaction medium but the oxidation is then slower than when the polyfluoroalkanol is in solution. The permanganate is preferably added portionwise, as a finely divided solid or as an aqueous or acetic acid solution, until its purple color is no longer discharged at an appreciable rate. The reaction temperature is not critical and any desired temperature between 0° C. and the boiling point of the solution may be used. A preferred range is between 50 and 100° C.

The resulting polyfluorocarboxylic acid is most conveniently isolated from the oxidation mixture as the crude manganous salt by evaporation of the solvent or diluent. Upon acidification of the salt, the free acid is formed and can be obtained by solvent extraction and distillation. If desired, the manganous salt may be purified, prior to acidification, by dissolving it in an appropriate solvent and reprecipitating it therefrom. The manganous salt may also be converted to an alkali metal salt, e. g., the sodium or potassium salt, and the latter may be acidified to isolate the free acid.

The invention is illustrated in greater detail in the following examples, in which parts are by weight.

*Example I*

A solution of 66 parts of dodecafluoro-1-heptanol, $H(CF_2CF_2)_3$—$CH_2OH$, in 200 parts of glacial acetic acid was treated at 70–100° C. with 42 parts of finely divided potassium permanganate added gradually. The manganese dioxide which had formed was reduced by bubbling sulfur dioxide into the solution until the dark color was discharged. The acetic acid was distilled from the mixture under reduced pressure and finally removed by codistillation with toluene. The crude manganese salt of dodecafluoroheptanoic acid (71 parts) was dissolved in dilute sulfuric acid and the solution was extracted with ether. Distillation of the ether solution gave 29 parts of free acid, B. P. 190–193° C., neutral equivalent 332. The acid was converted to the potassium salt by addition of 12 parts of potassium hydroxide to an ethanol solution of the acid. The potassium salt of dodecafluoroheptanoic acid was precipitated from the filtrate by addition of toluene and boiling. There was thus obtained 25 parts of pure potassium dodecafluoroheptanoate. This was a white crystalline solid highly soluble in water and appreciably soluble in a number of organic solvents such as ethanol, methanol, acetic acid and phenol. A 0.2% aqueous solution of potassium dodecafluoroheptanoate had a surface tension of 50.8 dynes/cm. at 25° C., as compared to 71.7 for pure water. The free acid was also prepared by dissolving the potassium salt in dilute sulfuric acid and extracting with ether. The ether solution was distilled, leaving the free dodecafluoroheptanoic acid, B. P. 192° C.

*Example II*

A solution of 69 parts of hexadecafluorononanol, $H(CF_2CF_2)_4CH_2OH$, in 500 parts of glacial acetic acid was treated at 70–100° C. with 59 parts of finely ground potassium permanganate and refluxed for 1 hour. The manganese salt of hexadecafluorononanoic acid was isolated as in Example I, then redissolved in 1000 parts of ethanol and converted to the potassium salt by addition of potassium hydroxide to the boiling ethanol solution. The precipitated manganese dioxide was filtered from the solution and by the procedure of Example I there was obtained 52 parts of crude potassium hexadecafluorononanoate. The free acid was isolated by acidifying the salt with dilute sulfuric acid, extracting with ether, evaporating the ether and recrystallizing the residue from benzene. The acid had a melting point of 62–68° C., a boiling point of 220–230° C. and a neutralization equivalent of 463 (calculated: 446). The potassium salt was soluble in water and appreciably soluble in organic solvents such as ethanol, methanol, acetic acid and phenol. A 0.2% aqueous solution of this salt had a surface tension of 35.6 dynes/cm. at 25° C., as compared to 71.7 for pure water.

*Example III*

A solution of 27 parts of eicosafluoroundecanol, $H(CF_2CF_2)_5CH_2OH$ (M. P. 95–97° C.) in 500 parts of glacial acetic acid was treated at 100° C. with 32 parts of finely ground potassium permanganate. The manganese dioxide formed in the reaction was reduced by bubbling sulfur dioxide into the reaction mixture until the dark color was removed. The acetic acid was removed by distillation under reduced pressure and the last traces were removed by codistillation with toluene. The solid residue was then extracted several times with water and the insoluble manganese salt of eicosafluoroundecanoic acid was filtered, dissolved in ethanol and converted to the potassium salt by treatment with excess potassium hydroxide. Upon boiling the solution, manganese dioxide precipitated and was removed by filtration. The potassium salt was then precipitated from the alcohol filtrate by treatment with toluene at the boiling point. Crystallization of the crude salt from an ethanol-toluene mixture give 15 parts of pure potassium eicosafluoroundecanoate. This was a solid soluble in water and whose 0.2% aqueous solution had a surface tension of 34.6 dynes/cm. The free eicosafluoroundecanoic acid was obtained by dissolving the potassium salt in dilute sulfuric acid and extracting the resulting slurry with ether. Alternatively, since the acid is sparingly soluble in water it may be filtered from the acidic aqueous solution and purified by crystallization from toluene. Eicosafluoroundecanoic acid is a crystalline solid melting at 100–101° C., sparingly water-soluble and soluble in benzene, toluene, chloroform, carbon tetrachloride, ether, methanol and ethanol. Its neutralization equivalent was 564 (calculated: 546).

*Example IV*

A solution of 21 parts of tetracosafluorotridecanol, $H(CF_2CF_2)_6CH_2OH$, in 300 parts of glacial acetic acid was treated gradually at 100° C. with 30 parts of finely ground potassium permanganate, then refluxed for 1 hour. The manganese salt of tetracosafluorotridecanoic acid was isolated as in the preceding examples, then treated directly with dilute sulfuric acid and the acidified mixture was extracted with ether. The ether solution was evaporated and the residue was crystallized from benzene, giving 8 parts of tetracosafluorotridecanoic acid, M. P. 138° C., neutralization equivalent 642 (calculated: 646). A 0.2% aqueous solution of potassium tetracosafluorotridecanoate has a surface tension of 38.6 dynes/cm. at 25° C.

*Example V*

Twenty-five parts of a mixture of polyfluoroalkanols $H(CF_2CF_2)_xCH_2OH$ consisting chiefly of nine, eleven and thirteen carbon compounds, with some higher fractions, was dissolved in 100 parts of glacial acetic acid. This solution was stirred and maintained at 50–60° C. during addition of 15 parts of powdered potassium permanganate in small increments over a period of 3 hours. The reaction mixture was finally refluxed for 10 minutes, cooled, diluted with water, and filtered. The filter cake of manganese dioxide was washed with hot glacial acetic acid. The filtrate was evaporated leaving a residue of the reaction product in the form of crude salts. This was placed in 500 parts of boiling water which was then strongly acidified with hydrochloric acid. Seven parts of a reddish brown oil separated and solidified upon cooling. Three parts of this crude acid was dissolved in 50 parts of boiling carbon tetrachloride, which solution was filtered and cooled. The crystalline polyfluoroalkanoic acid mixture which separated had a melting point in the range of 77–88° C. and a neutralization equivalent of 684, indicating that the average of the composition was $H(CF_2)_{12.7}COOH$.

*Example VI*

Five parts of a mixture of polyfluoropolychloroalkanols boiling at 110–130° C. at 4 mm. pressure (obtained by heating under autogenous pressure methanol and trifluorochloroethylene with alpha, alpha'-azodiisobutyronitrile catalyst at 70° C. for 8 hours) was dissolved in 50 parts of glacial acetic acid and the solution was treated slowly at the boiling point with 10 parts of potassium permanganate. After the addition was complete and the resulting sludge had been refluxed several minutes, sulfur dioxide was bubbled into the reaction mixture until it became clear. The solution was evaporated to dryness at 2 mm. pressure and the residue was washed with 20 parts of toluene, then treated with water and acidified with sulfuric acid. There was formed a two-layer solution which was extracted with two 20-part portions of ether. The combined ether extracts, after drying and removing the ether, gave on distillation 1 part of a clear liquid boiling at 42° C. at 45 mm. pressure and 0.5 part of a yellow oil boiling at 100–130° C. at 3 mm. pressure. The first fraction had a neutralization equivalent of 145.7, indicating that it was chiefly the acid $H(C_2F_3Cl)COOH$, probably mixed with a little acetic acid. The second fraction had a neutralization equivalent of 414.7, corresponding to the acid $H(C_2F_3Cl)_3COOH$ (calculated neutralization equivalent: 395.5) mixed with a little of the acid $H(C_2F_3Cl)_4COOH$.

*Example VII*

A mixture of 2.5 parts of hexadecafluorononanol $H(CF_2CF_2)_4CH_2OH$, with 12.5 parts of 60% aqueous nitric acid was cooled in an ice water bath and there was added 3 parts of liquid nitrogen peroxide, $N_2O_4$. This mixture was placed in an open glass tube enclosed in a stainless steel autoclave having a capacity of approximately 100 parts water. The autoclave was then sealed and immersed in a bath of heat transfer salt heated at 280° C. A pressure of 700 lb./sq. in. was reached in about 15 minutes and these reaction conditions were maintained for ½ hour. The autoclave was then removed from the bath, cooled, and the pressure released. The contents of the glass tube separated into 2 layers. The lower organic layer was separated from the upper aqueous layer and dissolved in 20% aqueous sodium hydroxide. Hexadecafluorononanol was removed by filtration. The filtrate was then acidified with hydrochloric acid to obtain hexadecafluorononanoic acid.

The products of this invention are the straight chain polyfluoroalkanoic acid having, exclusive of the carboxyl carbon, an even number, from 6 to 20 inclusive, of carbon atoms, all of which bear two halogen atoms of atomic weight below 40, at least half of the halogen atoms being fluorine, the terminal carbon bearing also one hydrogen atom. Additional examples of such acids are dotriacontafluoroheptodecanoic acid, $H(CF_2)_{16}COOH$; tetracontafluoroheneicosanoic acid, $H(CF_2)_{20}COOH$; octafluorooctachlorononanoic acid, $H(CF_2CCl_2)_4COOH$; hexafluorohexachloroheptanoic acid $H(CFCl-CFCl)_3COOH$, and the like. The products of the invention also include the ammonium salts and the metallic salts of these acids, e. g., the sodium, potassium, copper, calcium, zinc, barium, mercury, aluminum, manganese, iron salts, etc. For example, an aluminum polyfluorocarboxylate which has special uses as an ingredient of greases may be prepared as follows:

Six parts of the potassium salt of a mixture of polyfluorocarboxylic acids having the average composition $H(CF_2)_{12}COOH$ was placed in 600 parts of boiling water and to this solution was added 1.5 parts of aluminum sulfate, $$Al_2(SO_4)_3 \cdot 18H_2O$$

dissolved in 25 parts of water. A gelatinous preciptate of aluminum polyfluorocarboxylate separated. This was filtered and dried, dissolved in about 50 parts of acetone and the solution was filtered. The salt was reprecipitated from the acetone filtrate by treatment with about 200 parts of water. The mixture was boiled to remove the acetone and there was isolated, by filtration and drying, 4.5 parts of the purified aluminum polyfluorocarboxylate.

The most useful compounds obtainable by this invention are the fluorinated acids and salts of the formula $H(CF_2CF_2)_nCOOM$ wherein $n$ is an integer from 4 to 8 and M is hydrogen or an ammonium or metal cation, since these specific compounds have been found most effective in the technical applications outlined below.

The polyfluoroalkanoic acids of this invention are highly stable, nonflammable materials useful as chemical intermediates, e. g. in the synthesis of highly fluorinated esters, amides, etc. Their ammonium and alkali metal salts exhibit marked surface-active properties (evidenced only for those acids having at least 7 carbon atoms) which makes them useful as wetting, dispersing and emulsifying agents having high stability. For example, the ammonium and alkali metal salts are valuable dispersing agents in the aqueous polymerization of various polymerizable materials. Specifically, it is possible with their use to polymerize tetrafluoroethylene in aqueous systems directly to colloidal polymer dispersions having very high solids contents, an operation which is not possible with the conventional emulsifying agents. Among the other metallic salts of polyfluoroalkanoic acids, the aluminum salts are especially useful as ingredients of fluorinated greases. For example, by dissolving an aluminum polyfluorocarboxylate in a perfluorinated hydrocarbon and cooling the solution, a high melting, heat-reversible gel is obtained. Such gels have high film strength with good friction-reducing properties, are non-bleeding and non-flammable and have good adhesiveness. They are therefore attractive as lubricants in severe environments where resistance to heat, chemicals, solvents and/or oxidation is desired. The preparation of a grease of this type is described below.

Three parts of a perfluorinated oil, B. P. 170–190° C. at 10 mm. pressure, which had been prepared by the substantially complete fluorination in the vapor phase of lubricating oil with cobalt trifluoride, was mixed with one part of the aluminum salt of a mixture of polyfluorocarboxylic acids having the average composition $H(CF_2)_{10}COOH$. The mixture was heated for several minutes at about 200° C. to obtain a clear, homogeneous solution. This solution was allowed to cool. At 180° C. it solidified to a firm, heat-reversible gel which did not synerize or "bleed" upon further cooling to room temperature and storing at this or any temperature up to the gel melting point. This gel was a firm grease with good adhesion to glass and metal surfaces and which had good film strength and lubricating properties on glass or metal valves. Another composition comprising 5.7 parts of perfluorinated oil and 1 part of aluminum polyfluorocarboxylate had similar properties. A 5% solution of the same aluminum salt in a perfluorinated oil boiling at 210–240° C. at 10 mm. pressure was a non-gelling, clear, sticky lubricating composition.

As many apparently widely different embodiments of this invention may be made without departing from the spirit and scope thereof, it is to be understood that this invention is not limited to the specific embodiments thereof except as defined in the appended claims.

I claim:

1. A polyfluoroalkanoic compound having the formula $H(CX_2CX_2)_nCOOM$ wherein the X substituents are halogen atoms of atomic weight below 40 and at least half of the halogen atoms in each $CX_2CX_2$ group are fluorine, $n$ is a positive interger from 3 to 10 inclusive and M is a member of the class consisting of hydrogen, ammonium and metal cations.

2. A polyfluoroalkanoic compound having the formula $H(CF_2CF_2)_nCOOM$ wherein $n$ is a positive integer from 3 to 10 inclusive and M is a member of the class consisting of hydrogen, ammonium and metal cations.

3. A polyfluoroalkanoic acid having the formula $H(CX_2CX_2)_nCOOH$ wherein the X substituents are halogen atoms of atomic weight below 40 and at least half of the halogen atoms in each $CX_2CX_2$ group are fluorine, and $n$ is a positive integer from 3 to 10 inclusive.

4. A polyfluoroalkanoic acid having the formula $H(CF_2CF_2)_nCOOH$ wherein $n$ is a positive interger from 3 to 10 inclusive.

5. A method for preparing polyfluoroalkanoic compounds which comprises oxidizing a polyfluoroalkanol with a member of the class consisting of the alkali and alkaline earth metal permanganates, said polyfluoroalkanol having the formula $H(CX_2CX_2)_nCH_2OH$ wherein the X substituents are halogen atoms of atomic weight below 40 and at least half of said halogen atoms in each $CX_2CX_2$ group are fluorine, and $n$ is a positive integer from 3 to 10 inclusive.

6. A method for preparing polyfluoroalkanoic compounds which comprises oxidizing a polyfluoroalkanol with a member of the class consisting of the alkali and alkaline earth metal permanganates, said polyfluoroalkanol having the formula $H(CF_2CF_2)_nCH_2OH$ wherein $n$ is a positive integer from 3 to 10 inclusive.

7. The method set forth in claim 6 in which said polyfluoroalkanol is oxidized in an alkanoic acid solvent.

8. The method set form in claim 6 in which said polyfluoroalkanol is oxidized with potassium permanganate.

9. A method for preparing polyfluoroalkanoic acids which comprises oxidizing a polyfluoroalkanol dissolved in acetic acid with potassium permanganate, said polyfluoroalkanol having the formula $H(CF_2CF_2)_nCH_2OH$ wherein $n$ is a positive integer from 3 to 10 inclusive.

10. A mixture of polyfluoroalkanoic acids having the formula $H(CF_2CF_2)_nCOOH$ wherein $n$ is a positive integer from 4 to 8.

11. The polyfluoroalkanoic acid, hexadecafluorononanoic acid having the formula $H(CF_2CF_2)_4COOH$ 12. The polyfluoroalkanoic acid, eicosafluoroundecanoic acid having the formula $H(CF_2CF_2)_5COOH$ 13. The polyfluoroalkanoic acid, tetracosafluorotridecanoic acid having the formula $H(CF_2CF_2)_6COOH$

KENNETH L. BERRY.

REFERENCES CITED

The following references are of record in the file of this patent:

FOREIGN PATENTS

| Number | Country | Date |
| --- | --- | --- |
| 452,579 | Great Britain | Aug. 25, 1936 |

OTHER REFERENCES

Henne et al., Am. Chem. Soc., vol. 67, pp. 918 and 919.

Bulletins de L'Academie Royale de Belgique—Classe de Sciences (1902) p. 757.